(12) United States Patent
Kilian et al.

(10) Patent No.: US 7,587,399 B2
(45) Date of Patent: Sep. 8, 2009

(54) INTEGRATED SOFTWARE TOOLSET FOR A WEB SERVER

(75) Inventors: Frank Kilian, Mannheim (DE); Christian Fleischer, Mannheim (DE); Oliver Luik, Wiesloch (DE)

(73) Assignee: SAP AG, Walldorf (DE)

( * ) Notice: Subject to any disclaimer, the term of this patent is extended or adjusted under 35 U.S.C. 154(b) by 185 days.

(21) Appl. No.: 11/322,980

(22) Filed: Dec. 30, 2005

(65) Prior Publication Data

US 2007/0162469 A1 Jul. 12, 2007

(51) Int. Cl.
*G06F 17/30* (2006.01)
(52) U.S. Cl. .......................... 707/10; 707/102; 709/231
(58) Field of Classification Search ............... 707/8, 707/10, 120, 102; 709/213, 214, 231
See application file for complete search history.

(56) References Cited

U.S. PATENT DOCUMENTS

| | | | | |
|---|---|---|---|---|
| 5,887,170 A | * | 3/1999 | Ansberry et al. | 709/204 |
| 5,893,140 A | * | 4/1999 | Vahalia et al. | 711/118 |
| 5,944,789 A | * | 8/1999 | Tzelnic et al. | 709/214 |
| 5,948,062 A | * | 9/1999 | Tzelnic et al. | 709/219 |
| 6,044,438 A | * | 3/2000 | Olnowich | 711/130 |
| 6,088,363 A | * | 7/2000 | Shiobara | 370/461 |
| 6,493,745 B1 | * | 12/2002 | Cherian | 709/206 |
| 6,854,114 B1 | * | 2/2005 | Sexton et al. | 718/1 |
| 6,868,442 B1 | * | 3/2005 | Burdeau | 709/223 |
| 7,127,713 B2 | * | 10/2006 | Davis et al. | 717/177 |
| 2002/0026513 A1 | * | 2/2002 | Hoglund et al. | 709/227 |
| 2002/0108121 A1 | * | 8/2002 | Alao et al. | 725/110 |

OTHER PUBLICATIONS

"JVPM: Network Parallel Computing in Java" Adam J. Ferrari http://www.cs.virginia.edu/jpvm/doc/jpvm-java98.pdf Archived Sep. 1, 2000 by archive.org: http://web.archive.org/web/20000901042534/http://www.cs.virginia.edu/jpvm/doc/jpvm-java98.pdf.*
"Calling C Library Routines from Java" Numerical Algorithms Group Jul. 2003 www.ddj.com.*

* cited by examiner

*Primary Examiner*—Etienne P LeRoux
*Assistant Examiner*—Bruce A Witzenburg
(74) *Attorney, Agent, or Firm*—Blakely Sokoloff Taylor & Zafman

(57) ABSTRACT

A software toolset includes a number of software modules that handle control and data communication within a web application server instance. An application programmatic interface (API) provides a common interface to communicate with the software modules in the toolset.

10 Claims, 3 Drawing Sheets

INTEGRATED SOFTWARE TOOLSET FOR A WEB SERVER

FIELD OF INVENTION

The field of invention relates generally to web application servers. In particular, the invention relates to a common API for a toolset containing a software library that provides for management and control of an application server instance in a web application server cluster.

BACKGROUND

Web application server (web AS) platforms are commercially available from a number of vendors, such as SAP Web Application Server, available from SAP AG, Walldorf, Germany; Apache HTTP Server, version 2.2.0, available from Apache HTTP Server Project, Apache Software Foundation; and Internet Information Services (IIS) 6.0, available from Microsoft Corporation, Redmond, Wash.

A web AS platform generally is hardware platform-independent, and highly scalable using sophisticated session, caching, dispatching, and messaging techniques in a distributed computing environment. Web AS may employ a number, or cluster, of web application server (AS) instances, each of which may support a number of work processes for providing services. The cluster of web AS instances may be distributed over one or more computing platforms, and typically communicate with each other via a messaging service.

A web application server instance comprises a business environment, a relational database, and an internet connection manager. The business environment is responsible for the business content and underlying logic of the enterprise, published, for example, using the Business Server Pages/Java Server Pages. SAP's web application server comprises an ABAP environment in which existing components, such as business objects, can be used for the business logic. SAP's web application server further comprises a J2EE environment that processes requests passed from the ICM and dynamically generates responses, enabling web application developers to create web applications that include presentation and business logic using standard Java or J2EE technology. The relational database provides a repository for enterprise data. The internet connection manager (ICM) is an independent process responsible for communications between a Web AS instance and external client devices over intranets or the Internet using standard protocols like HTTP, HTTPS, and Simple Mail Transfer Protocol (SMTP).

While standard protocols and architectures are provided for external communications with the "front end" of a web AS, that is, communications between a web client on the Internet and the web AS, "back end" or internal services, protocols and architectures used in communications between application server instances may not be standardized. These internal communications might include, for example, communications between worker processes in an application server instance as well as communications between application server instances, and involve a proprietary communication architecture, such as a shared memory-based communication channel.

Use of proprietary internal services, protocols, and communication architectures makes difficult the reuse and/or porting of such services and protocols implemented in one web AS platform to another web AS platform. Additionally, internal services may use separate application programmatic interfaces to communicate with each other, even though the functionality provided by the APIs may overlap or be very similar, wasting memory and resources to develop, operate and maintain.

BRIEF DESCRIPTION OF THE DRAWINGS

A better understanding of the present invention can be obtained from the following detailed description in conjunction with the following drawings, in which.

SUMMARY

A software toolset includes a number of software modules that handle control and data communication within a web application server instance. An application programmatic interface (API) provides a common interface to communicate with the software modules in the toolset.

DETAILED DESCRIPTION

Figure 1:
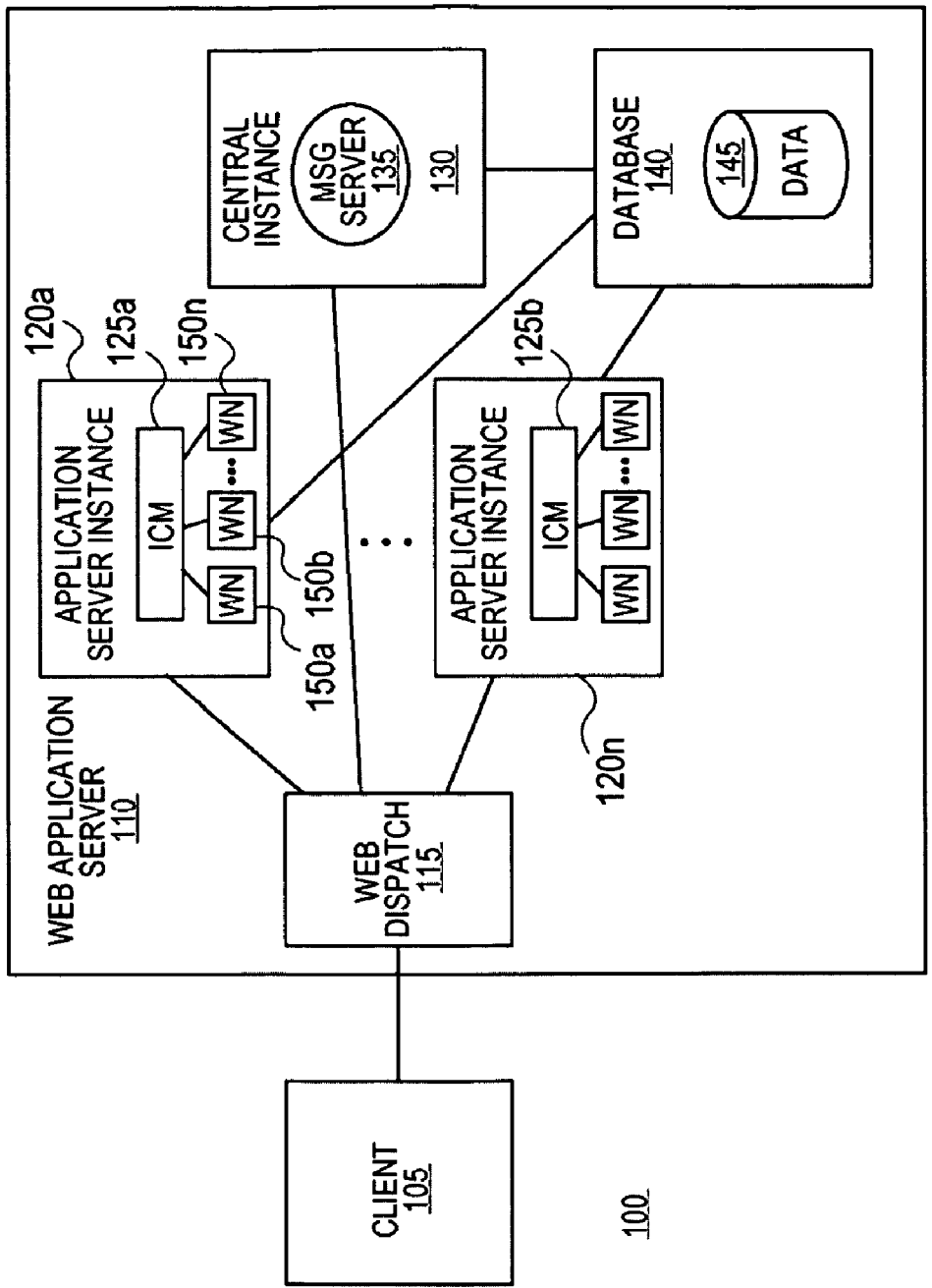
FIG. 1 is a block diagram of an application server cluster architecture that may be used in an embodiment of the invention.

FIG. 1 is a block diagram of a web application server 100 comprising a cluster of web application server instances 120a through 120n, and in which an embodiment of the invention may be used. The architecture includes a central services instance 130. Each web AS instance in the cluster can be started, stopped, and monitored separately by central services 130. In one embodiment, each AS instance runs on a separate computing platform, for example, a physical server, but more than one AS instance may run on a single platform. The AS instances may communicate with each other via a messaging service 135 of the central services instance 130. (The term "service" generally refers to a software entity, or server, that provides a function, e.g., as in the case herein, a messaging service).

An AS instance typically contains a number of worker processes, also referred to herein and in the figures as "worker nodes" (WN). For example, AS instance 120a includes worker nodes 150a through 150n. A worker node may also be referred to as an "application process", "work process", or "server process". Each worker process is resident in a virtual machine (VM). In one embodiment, the VM may be a Java Virtual Machine (JVM). In one embodiment of the invention, the worker processes are Java 2 Platform, Enterprise Edition ("J2EE") worker processes that support Enterprise Java Bean ("EJB") components and EJB containers (at the business layer) and Servlets and Java Server Pages ("JSP") (at the presentation layer). A J2EE platform complies with the J2EE Standard. Of course, certain aspects of the embodiment of the invention described herein may be implemented in the context of other web application server infrastructure platforms including, by way of example, the .NET platform available from Microsoft, the WebSphere platform available from IBM, and the Advanced Business Application Programming ("ABAP") platform available from SAP AG, the assignee of this invention. In any case, each of the worker processes within a particular AS instance may be configured with a redundant set of application logic and associated data.

Additionally, an AS instance includes an internetwork communication manager (ICM) 125 to receive service requests from clients such as client 105 via a network and deliver responses (e.g., the result of some action or processing on the part of one or more of the worker processes) as may be appropriate, from the worker processes to the clients. A web dispatcher 115 receives client requests from the network and distributes them among the AS instances, where they are received by a respective AS instance's ICM.

An AS instance further includes one or more dispatchers (not shown in FIG. 1) associated with the worker processes to which the dispatcher selectively distributes the client service requests received by the ICM. In one embodiment the dispatcher may be combined with the ICM or, alternatively, the dispatcher may stand alone as a separate program in the AS instance and communicate with the ICM to receive and dispatch the service requests to its associated worker processes. The AS instance's dispatcher distributes client requests among its worker processes, based, for example, on the load on each of the worker processes. In one embodiment, a dispatcher implements a round-robin policy of distributing service requests (although various alternate load-balancing techniques may be employed).

In the example web application server architecture illustrated in FIG. 1, the AS instances 120a . . . 120n share a central database system 140 that includes a persistent data store (e.g., data store 145). Worker processes executing in each AS instance may store and retrieve information from the database in servicing the requests from clients. Additionally, the cluster may be centrally defined and configured in the central database.

AS instances receive requests from one or more clients, for example, via web client 105, over a distributed internetwork such as the Internet. In one embodiment, requests from the web client may be transmitted using hypertext transfer protocol (HTTP), secure HTTP (HTTPS), the simple mail transfer protocol (SMTP), or the simple object access protocol (SOAP). The ICM 125 provides support for the various relevant internetworking communication protocols, and is configured to allow an independent software module that supports a particular protocol to be plugged in to the connection handler in the ICM.

In one embodiment, message server 135 provides a message service for communication between AS instances via a message passing protocol. For example, if a worker process 150a of AS instance 125a has a message to send to AS instance 120n (i.e., an "internal message" from the perspective of web server 100), the message is sent from the worker process' own cluster manager (see FIG. 2, reference 250) to the message server, which receives and brokers the message from AS instance 120a and then forwards it to AS instance 120n, providing for asynchronous communication between the AS instances.

Figure 2:
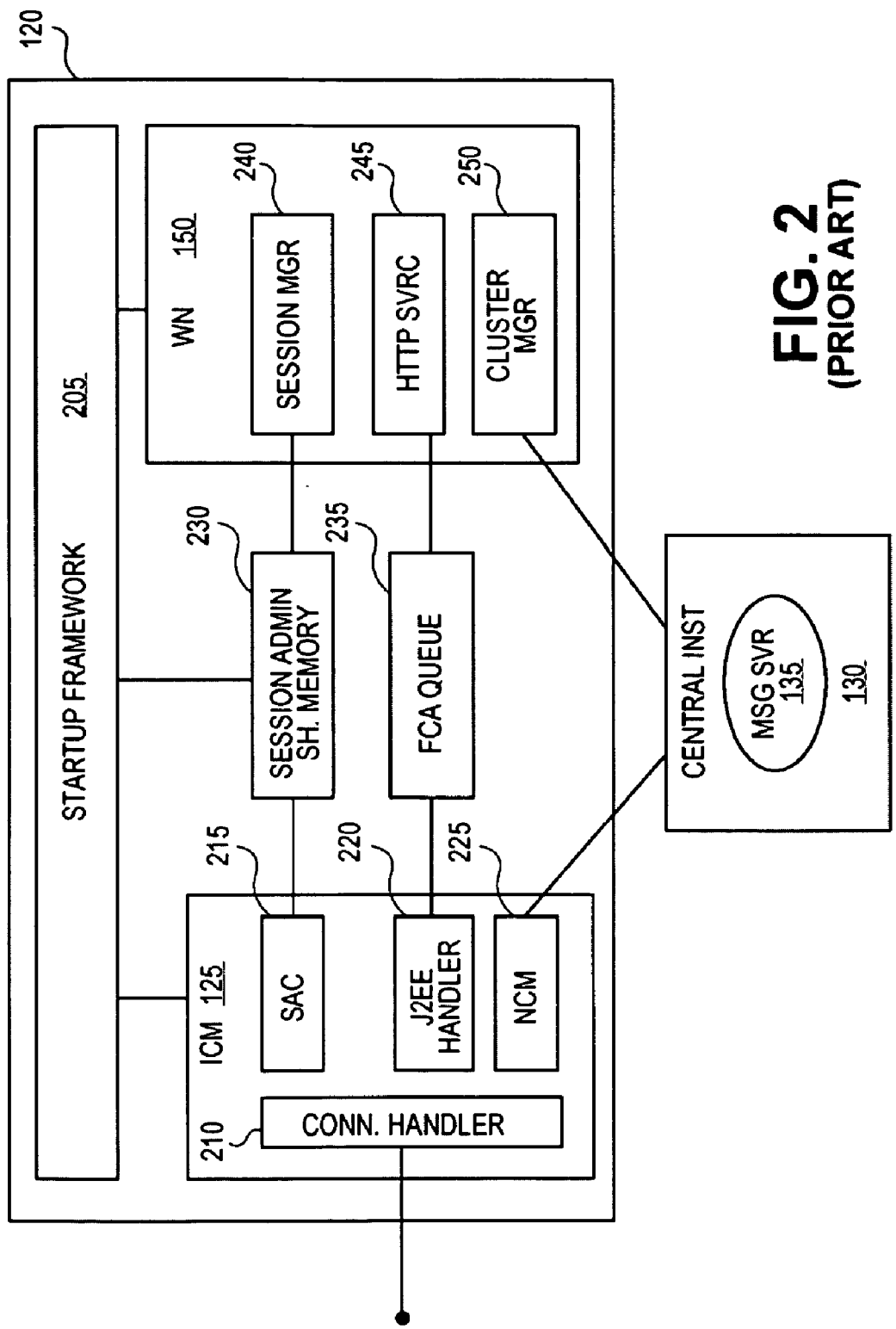
FIG. 2 is a block diagram of the software architecture of an application server instance that may be used in an embodiment of the invention.

In one embodiment, all communication with the message server is via a cluster manager service, or simply "cluster manager", a software service that handles communicating messages with, and sending and receiving notifications of events in the cluster to/from, the message server. FIG. 2 provides a block diagram of an application server instance that includes a cluster manager 225 in the Internet Connection Manager (ICM) 125. The cluster manager exchanges internal cluster messages with message server 135, for example, to facilitate load balancing between various AS instances in the cluster, to send and receive notification of events that arise within a cluster, such as failure or shutdown of an AS instance or worker process in an AS instance, a service being started or stopped, or to update state information in the cluster. Cluster state may change upon occurrence of such events as: adding a new worker process to the cluster; shutting down an existing worker process; changing a state of a worker process; or, changing the ability or availability of a worker process to communicate with other nodes in the cluster.

The cluster manager in an AS instance further provides for communications with an AS instance via the message server, which also may broker such communications. (A broker is defined herein as software entity which mediates between two objects, typically between a client and a server, such as an AS instance (client) and message server (server). In one embodiment, the message server may translate a message from a formal messaging protocol of the sender to the formal messaging protocol of the receiver.)

Cluster manager 225 comprises three handlers: an event handler, notification handler, and a message server communication handler. A handler is known in the art as a subprogram that is called in response to an "event", such as an AS instance being started or stopped, or adding or stopping a worker process. The notification handler is called in response to a specific event in the cluster and performs a function or causes a function to be performed in the AS instance in response to detection and communication of that event from the message server. Likewise, event handler provides notice of an event in the AS instance to the message server. Finally, message server communication handler provides for communicating messages between the AS instance and the message server, which in turn, processes the message and either forwards the message on to appropriate elements in the cluster or generates a new message to do the same.

Cluster manager may be written in native application program code such as C, C++, or assembly, reside in a software library, and be dynamically linked to the ICM at run time. In this way, the cluster manager may be written in a language specific to a particular hardware and/or operating system platform. A cluster manager written in a platform specific language is referred to herein a native cluster manager (NCM) 225.

To the extent the ICM is implemented in Java code running on a Java virtual machine (VM), NCM 225 may utilize the Java Native Interface (JNI), which allows Java code running in the Java virtual machine (VM) to call the native cluster manager, and allow the native cluster manager to call cluster elements implemented in Java code. The JNI is used to write native methods to handle situations if the cluster manager cannot be written completely in the Java programming language, for example, if the standard Java class library does not support any platform-dependent features or program library. JNI may also used to modify the cluster manager, if written in a programming language other than Java, to be accessible to Java applications.

The web server infrastructure illustrated in FIG. 1 separates communications relating to external client service requests and responses from internal communications relating to the interoperation of the application server instances in the cluster. Client service requests and responses, herein referred to as "session" communications, involve an exchange of messages between the ICM and a worker process in an AS instance to process the client request or any response thereto. An HTTP request from an external web client such as a web browser application is an example of a session communication. The back and forth communication typically involves a client sending a request that a worker process interprets into some action to be performed by the server. The worker process performs the action and if appropriate returns a "response" to the client (e.g., a result of the action). Often, a session will involve multiple, perhaps many, requests and responses. A session administration client (SAC) software module 215 handles assigning and monitoring of sessions between ICM 125 and worker nodes 150, providing services such as load balancing, i.e., determining with which worker node a session is to be established to handle a client request, and transferring requests from an existing session to another session in the event the existing session terminates, or becomes overloaded.

In addition, a shared memory region 230 is provided to store session objects having "low level" session state information (i.e., information that pertains to a request's substantive response such as the identity of a specific servlet invoked through a particular web page), and to store "high level" session state information (i.e., information that pertains to the flow management of a request/response pair within the application server (e.g., the number of outstanding active requests for a session)). In one embodiment, the shared memory region may be treated as two separate memory regions, one for the low level session information, the other one for the high level session information.

ICM 125 further includes a J2EE handler 220 for communicating the requests and responses exchanged between worker processes and web clients. A shared memory architecture, referred to herein as Fast Channel Architecture (FCA) 235, provides a queue-based memory pipe for exchanging data between worker processes and web clients. In particular, the FCA includes a shared memory region that supports request/response data transfers as well as another shared memory region that supports request notification queues, one queue for each of the worker processes in the application server instance. The FCA shared memory structure and request notification queues, along with the session administration client shared memory region 230, help implement a fast session fail over protection mechanism in which a session that is assigned to a first worker node can be readily transferred to a second worker node upon the failure of the first worker node.

Shared memory is memory whose stored content can be reached by multiple worker nodes. Different types of shared memory technologies may be utilized within the application server instance and yet still be deemed as being a shared memory structure. For example, shared memory may be implemented within a "connection" oriented shared memory technology or with a "shared closure" oriented shared memory technology.

A connection oriented request/response shared memory region effectively implements a transport mechanism for request/response data between the connection manager and the worker processes. That is, because the connection manager is communicatively coupled to the shared memory, and because the shared memory is accessible to each worker process, the request/response shared memory—at perhaps its broadest level of abstraction—is a mechanism for transporting request/response data between the connection manager and the applicable worker processes for normal operation of sessions (i.e., no worker process failure) as well as those sessions affected by a worker node crash.

While the embodiment illustrated in FIG. 2 contemplates the three software modules 215, 220 and 225, it is appreciated that other software modules may also be supported by ICM. ICM may implement a handler into which a service may be plugged in to provide services for the application server instance.

In one embodiment of the invention, it is contemplated that the functionality of the ICM may be provided according to different vendor specific implementations. For example, the ICM functionality may be provided by a web application server implemented according to various commercially available web application server platforms, such as SAP's Web Application Server, the Apache Software Foundation's HTTP Server, and Microsoft's Internet Information Services (IIS).

Figure 3:
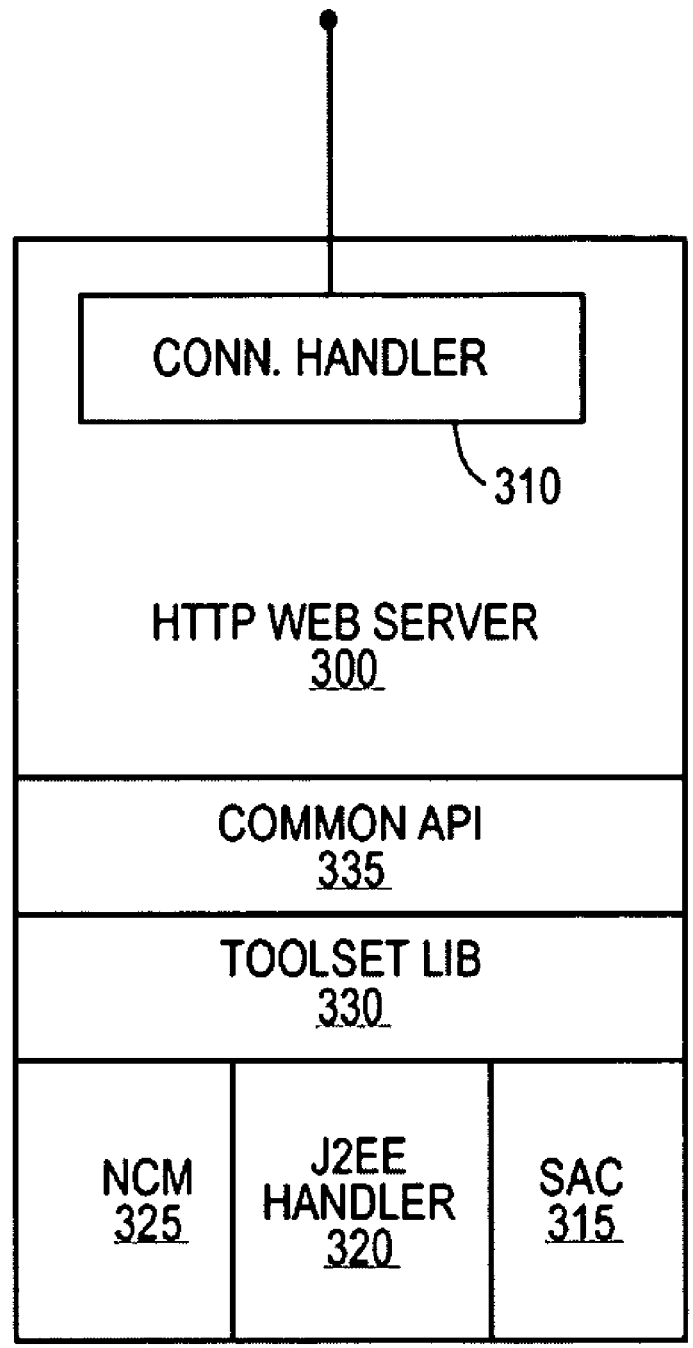
FIG. 3 is a block diagram of an embodiment of the invention.

With reference to FIG. 3, to reuse the software modules 215, 220 and 225 in other implementations of web server application instances, the modules may be placed in one or more libraries 315, 320, 325 and provided as a toolset 330 that can be integrated into different web application server platforms. Moreover, just as described above for the cluster manager, any of the software modules may be written in a native application program code such as C, C++, or assembly, reside in a software library, and be dynamically linked to the a Web AS platform's front end or ICM-equivalent software component(s) at run time. In this way, the software modules may be written in a language specific to a particular hardware and/or operating system platform, and plugged into to other application server instances available from any number of vendors.

Each of the software modules in the toolset may provide their own API. However, there may be significant overlap between the functions provided by two or more of the software modules in the library. One embodiment of the invention, then, contemplates wrapping the toolset library in a single API that provides the functionality needed to communicate with each of the software modules/libraries in the toolset. In so doing, the interface may be simplified and reduced in size. Moreover, a developer need only deal with one API when adding or interfacing the toolset to the web application server platform's ICM-equivalent functions.

Elements of embodiments of the present invention may also be provided as a machine-readable medium for storing the machine-executable instructions. The machine-readable medium may include, but is not limited to, flash memory, optical disks, CD-ROMs, DVD ROMs, RAMs, EPROMs, EEPROMs, magnetic or optical cards, or other type of machine-readable media suitable for storing electronic instructions. The machine-executable instructions may then be executed by a processor in a computer.

It should be appreciated that reference throughout this specification to "one embodiment" or "an embodiment" means that a particular feature, structure or characteristic described in connection with the embodiment is included in at least one embodiment of the present invention. These references are not necessarily all referring to the same embodiment. Furthermore, the particular features, structures or characteristics may be combined as suitable in one or more embodiments of the invention.

What is claimed is:

1. A web application server platform, comprising:
   a software toolset having,
      dynamically linked software modules including a session administration client module, a cluster manager module, and a first handler module, wherein at least one of the dynamically linked software modules is written in a computer programming language specific to one of a hardware platform and an operating system platform, and
      a common application programming interface (API) for all of the dynamically linked software modules:
   a cluster of web application server instances, each web application server instance resident on a respective virtual machine, each web application server instance including,
      one or more worker processes,
      a shared memory region accessible to the plurality of worker processes of the web application server instance, and an internet connection manager coupled to the shared memory, the internet connection manager including a second handler to receive services of the software toolset;

wherein the internet connection manager of each web application server instance is to access services of the first handler via the common API to exchange messages between the worker processes of the each web application server instance and clients serviced by the web application server platform, wherein the internet connection manager of each web application server instance is further to access a service of the session administration client module via the common API to communicate with the plurality of worker processes of the each web application server instance via the shared memory of the each web application server instance, the communicating to assign and monitor client sessions for the worker processes, and wherein the internet connection manager of each web application server instance is further to access services of the cluster manager module via the common API to exchange a message from one of the worker processes of the each web application server instance to another one of the web application server instances, the message to implement a load balancing of the cluster of web application server instances.

2. The web application server platform of claim 1, wherein the cluster of web application server instances further comprises a message server, and wherein exchanging a message from a worker processes of one of the web application server instances to another of the web application server instances includes the cluster manager module providing to the one web application server instance a service to communicate with the other web application server instance via the message server.

3. The web application server platform of claim 1, wherein the software toolset is in a software library.

4. The web application server platform of claim 3, wherein the software library is dynamically linked to the internet connection manager of the one of the web application server instances at runtime.

5. The web application server platform of claim 1, wherein the first handler is to communicate data between client and a worker process in one of the web application server instances via a shared memory region of the one of the web application server instances.

6. A computer readable storage medium having instructions stored thereon which, when executed by one or more processors, cause the one or more processors to perform a method comprising:

running a cluster of web application server instances, each web application server instance resident on a respective virtual machine of a web application server platform, each web application server instance including, one or more worker processes, a shared memory region accessible to the plurality of worker processes of the web application server instance, and an internet connection manager coupled to the shared memory, the internet connection manager having a handler:

plugging a software toolset into each respective handler of the internet connection managers of the web application server instances, the software toolset having, dynamically linked software modules including a session administration client module, a cluster manager module, and a first handler module, wherein at least one of the dynamically linked software modules is written in a computer programming language specific to one of a hardware platform and an operating system platform, and a common application programming interface (API) for all of the dynamically linked software modules; and for each web application server instance, the internet connection manager of the web application server instance accessing services of the first handler via the common API to exchange messages between the worker processes of the web application server instance and clients serviced by the web application server platform, the internet connection manager of the web application server instance accessing services of the session administration client module via the common API to communicate with the plurality of worker processes of the web application server instance via the shared memory of the web application server instance, the communicating to assign and monitor client sessions for the worker processes, and the internet connection manager of the web application server instance accessing services of the cluster manager module via the common API to exchange a message from one of the worker processes of the web application server instance to another one of the cluster of web application server instances, the message to implement a load balancing of the cluster of web application server instances.

7. The computer readable storage medium of claim 6, wherein the cluster of web application server instances further comprises a message server, and wherein exchanging a message from a worker processes of one of the web application server instances to another of the web application server instances includes the cluster manager module providing to the one web application server instance a service to communicate with the other web application server instance via the message server.

8. The computer readable storage medium of claim 6, wherein the software toolset is in a software library.

9. The computer readable storage medium of claim 8, wherein the software library is dynamically linked to the internet connection manager of the web application server instance at runtime.

10. The computer readable storage medium of claim 6, wherein the first handler is to communicate data between a client and a worker process in one of the web application server instances via a shared memory of the one of the web application server instances.

* * * * *

UNITED STATES PATENT AND TRADEMARK OFFICE
CERTIFICATE OF CORRECTION

PATENT NO. : 7,587,399 B2  Page 1 of 1
APPLICATION NO. : 11/322980
DATED : September 8, 2009
INVENTOR(S) : Kilian et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 222 days.

Signed and Sealed this

Twenty-first Day of September, 2010

David J. Kappos
*Director of the United States Patent and Trademark Office*